US010909635B2

(12) United States Patent
Cvetkovski (10) Patent No.: US 10,909,635 B2
(45) Date of Patent: Feb. 2, 2021

(54) MACHINE GENERATED FINANCIAL SUMMARY

(71) Applicant: REFINITIV US ORGANIZATION LLC, New York, NY (US)

(72) Inventor: Predrag Cvetkovski, New York, NY (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 199 days.

(21) Appl. No.: 14/189,287

(22) Filed: Feb. 25, 2014

(65) Prior Publication Data

US 2014/0310136 A1    Oct. 16, 2014

Related U.S. Application Data

(60) Provisional application No. 61/810,887, filed on Apr. 11, 2013.

(51) Int. Cl.
    *G06Q 40/00* (2012.01)
(52) U.S. Cl.
    CPC .................................. *G06Q 40/12* (2013.12)
(58) Field of Classification Search
    USPC ........................................... 705/35; 715/209
    See application file for complete search history.

(56) References Cited

U.S. PATENT DOCUMENTS

| | | | |
|---|---|---|---|
| 6,651,219 B1 * | 11/2003 | Elliott ................... | G06F 40/284 715/209 |
| 2007/0226099 A1 * | 9/2007 | Senturk-Doganaksoy ................. | G06Q 40/00 705/35 |
| 2008/0306882 A1 * | 12/2008 | Schiller .................. | G06Q 40/06 705/36 R |

OTHER PUBLICATIONS

Merrill Lynch, How to Read a Financial Report, 2000.*

* cited by examiner

*Primary Examiner* — Fahd A Obeid
*Assistant Examiner* — Reva R Moore (57) ABSTRACT

The present disclosure is directed towards systems and methods for generating a financial summary, which comprises identifying a first set of data items derived from one or more financial documents associated with an entity and a second set of data items derived from historical data associated with the entity. The systems and methods of the present disclosure then compare one or more data items of each set of data and select selecting a pre-defined reporting pattern based on the comparison, the selected pre-defined reporting pattern indicative of a possible financial result of the entity. A third set of data items supporting the selected pre-defined reporting pattern is then generated from the first and second sets of data items and a financial summary of the one or more financial documents is computed using the selected pre-defined reporting pattern and the third set of data items.

42 Claims, 6 Drawing Sheets

Financial Summary

For the three months ended 30 September 2012, Microsoft Corporation revenues decreased 8% to $16.01B. Net income decreased 22% to $4.47B. Revenues reflect Windows & Windows Live Division segment decrease of 9% to $4.4B, Entertainment and Devices Division segment decrease of 2% to $1.94B. Net income also reflects Unallocated and Other segment loss increase from $1.14B to $2.73B.

FIG. 6

MACHINE GENERATED FINANCIAL SUMMARY

CROSS-REFERENCE TO RELATED APPLICATION

This application claims priority to U.S. Provisional Application No. 61/810,887 filed Apr. 11, 2013, entitled "Machine Generated Financial Summary", the content of which is incorporated herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to machine driven logic. More specifically, the disclosure is directed towards systems and methods for utilizing machine driven logic to interpret and analyze financial documents and generate summaries of an entity's financial performance.

BACKGROUND

Investment decisions regarding the potential purchase or sale of investment assets often require prompt analysis of a company's financial data. This is especially true immediately after an entity's financial data is published, where there is a prompt need for a brief analytical insight across the investment community, such as audiences in wealth management, investment banking and investment management. An abbreviated analysis serves to aid the community in making timely decisions regarding the potential purchase or sale of investment assets. For example, on a regular basis, wealth managers have to provide a brief summary to their clients describing the overall performance of the clients' investments. Despite its brevity, such an analysis is typically labor intensive and performed by financial analysts that spend significant amount of time to identify, analyze and interpret company performance. Additionally, quality and inconsistency issues are of concern in generating such abbreviated financial summaries given the unique characteristics of different industries and the volume of entities and organizations that can be monitored by the investment community.

Considering the large investment audience and the limited time available for tailoring and distributing this analysis, as well as the necessity to maintain quality control, there exists a need for an automated mechanism to analyze and interpret performance results in a simple way that enables broader audiences with limited financial knowledge to understand an entity's financial performance.

SUMMARY

The present disclosure is directed towards systems and methods for generating financial summaries utilizing machine driven logic to interpret and analyze financial documents. In one aspect, the method includes identifying a first set of data items derived from one or more financial documents associated with an entity and identifying a second set of data items derived from historical data associated with the entity, each of the sets of data items comprising textual and numerical data items. One or more data items of the first set of data items is compared to one or more corresponding data items of the second set of data items and a pre-defined reporting pattern is selected based on the comparison, the selected pre-defined reporting pattern is indicative of a possible financial result of the entity The method also includes generating a third set of data items supporting the selected pre-defined reporting pattern from the first and second set of data items and generating automatically a financial summary of the one or more financial documents using the selected pre-defined reporting pattern and the third set of data items. Lastly, the method includes generating and transmitting a signal associated with the financial summary.

In one embodiment, the first set of data items includes one or more data items for a given reporting time period and the second set of data items includes one or more data items for one or more comparable prior time periods to the given reporting time period.

The first set of data items and the second set of data items may each comprise an entity's total revenue value and one of either a total net income value or a total net loss value. In one embodiment, the first set of data items and the second set of data items further each include business segment revenue values, business segment net income values, geographic segment revenue values, geographic segment net income value, operating metrics, dividends per share and earnings per share for a specific time period.

According to one embodiment, the third set of data items includes one or more data items of the first set of data items and of the second set of data items, and one or more delta values between the one or more data items of the first set of data items and the one or more data items of the second set of data items.

A system, as well as articles that include a machine-readable medium storing machine-readable program code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

Figure 1:
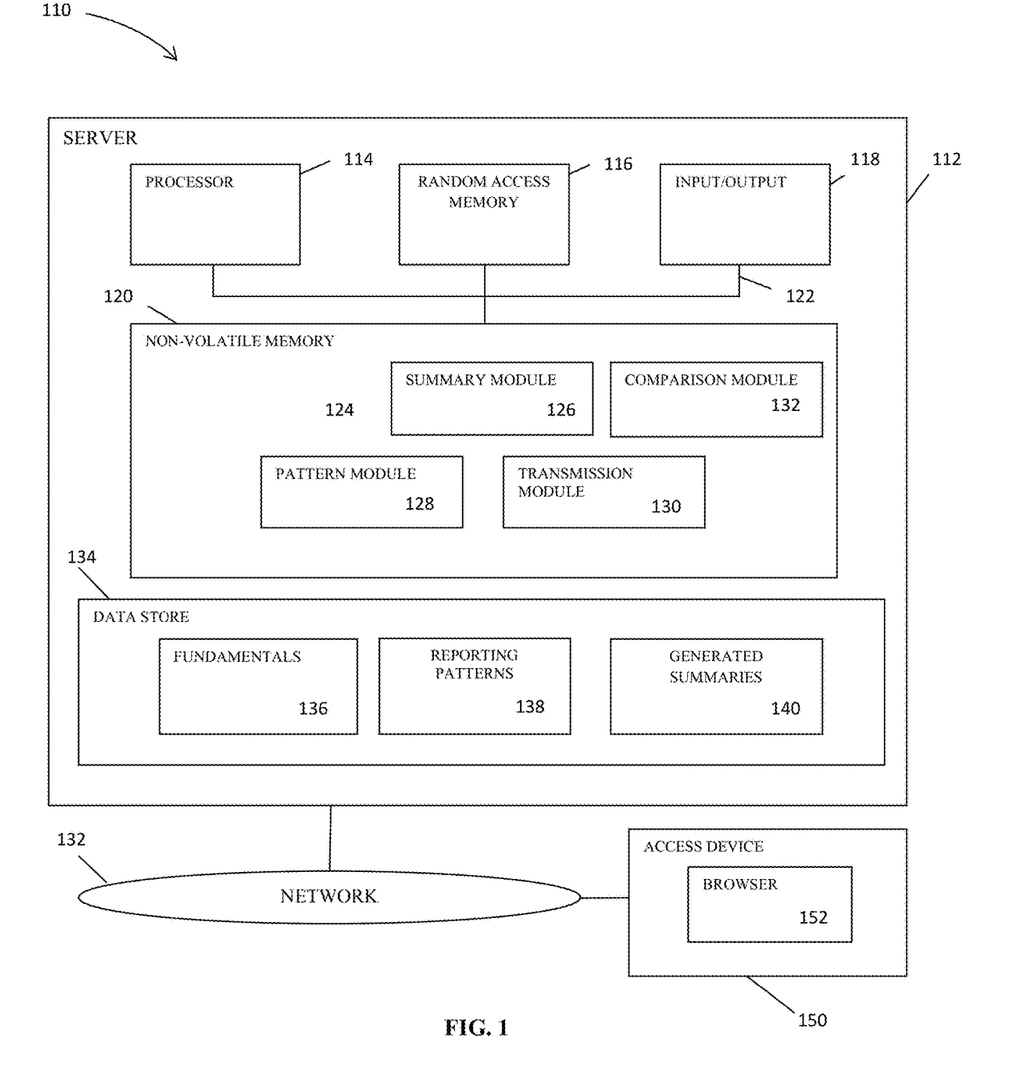
FIG. 1 is a schematic depicting an exemplary computer-based system for utilizing machine driven logic to interpret and analyze financial documents.

Turning now to FIG. 1, an example of a suitable computing system 110 within which embodiments of the disclosure may be implemented is presented. The computing system 110 is only one example and is not intended to suggest any limitation as to the scope of use or functionality of the disclosure. Neither should the computing system 110 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, etc. that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 1, the system 110 includes a server device 112 configured to include a processor 114, such as a central processing unit (CPU), random access memory ('RAM') 116, one or more input-output devices 118, such as a display device (not shown) and keyboard (not shown), non-volatile memory 120, all of which are interconnected via a common bus 122 and controlled by the processor 114.

As shown in the FIG. 1 example, in one embodiment, the non-volatile memory 120 is configured to include an identification module 124, a summary module 126, a pattern module 128, a transmission module 130 and a comparison module 132. The identification module 124 is configured to identify one or more data items derived from an entity's financial reports, as well as an entity's historical financial data, both of which are maintained in a fundamentals database 136. The comparison module 132 is operative to perform a comparison of data items. For example, the comparison module 132 is configured to compare an entity's total financial revenue across time reporting periods in order to determine an increase or decrease in revenue for the latest reporting period analyzed. The pattern module 128 is configured to select a pre-defined reporting pattern from a set of pre-defined reporting patterns 138 based upon the comparison of data items performed by the comparison module 132. In one embodiment, a summary module 126 is provided that generates a financial summary of one or more financial documents using the selected pre-defined reporting pattern. Lastly, a transmission module 130 is provided to generate and transmit a signal associated with a financial summary in response to a request. Additional details of these modules are 124, 126, 128, 130, and 132 are discussed in connection with FIGS. 2-5.

As shown in FIG. 1, in one embodiment, a network 132 is provided that can include various devices such as routers, server, and switching elements connected in an Intranet, Extranet or Internet configuration. In one embodiment, the network 132 uses wired communications to transfer information between an access device 150, the server device 112, and a data store 134. In another embodiment, the network 132 employs wireless communication protocols to transfer information between the access device 150, the server device 112, and a data store 134. In yet other embodiments, the network 132 employs a combination of wired and wireless technologies to transfer information between the access device 150, the server device 112, and the data store 134.

The data store 134 is a repository that maintains and stores information utilized by the before-mentioned modules 124, 126, 128, 130 and 132. In one embodiment, the data store 134 is a relational database. In another embodiment, the data store 134 is a directory server, such as a Lightweight Directory Access Protocol ("LDAP"). In yet another embodiment, the data store 134 is an area of non-volatile memory 120 of the server device 112.

In one embodiment, as shown in the FIG. 1 example, the data store 134 includes the fundamentals database 136, the set of pre-defined reporting patterns 138 and a set of generated summaries 140. According to one embodiment, the fundamentals database 136 includes a set of financial documents for one or more corporate entities. The set of financial documents may include, but is not limited to, one or more business documents, public business filings, Securities and Exchange ("SEC") filings, accounting standards, income statements, balance sheets, supplementary notes, papers, memos, treatises, new stories, articles, catalogs, organizational and legal documents, research, historical documents, policies and procedures and combinations thereof. The fundamental database 136, according to one embodiment, also includes financial and associated data derived from the financial documents, including but not limited to period financial information, company information, operating business and geographic segment data, operating metrics, key performance indicators, and per-share analytics.

The set of pre-defined reporting patterns 138, which according to one embodiment, is maintained in a structured data store, such as a relational or hierarchal database, includes a set of predefined business case scenarios, each dependent upon an analysis of an entity's financial data with corresponding reasons for the entity's financial performance. Table 1 provides an exemplary listing of predefined business case scenarios.

The data store 134 also includes a set of generated summaries 140, which includes machine generated financial summaries of an entity's financial performance derived from the financial data maintained in the fundamentals database 136. According to one embodiment, a given generated summary provides a positive, neutral or negative statement as to an entity's revenue and net income performance, as well as the specific facts that support the reasons for any described changes in the entity's financial performance. An exemplary generated summary includes an entity's name, financial information, including total revenue and net income/losses, and supporting negative and positive reasons for decreasing or increasing revenue and net income/losses, respectively. Exemplary reasons supporting an entity posting of increased or decreases revenue and net income/losses includes the financial performance of an entity's business and geographic segments, operating metrics, key performance indicators and the impact on an entity's total revenue and net income/losses.

According to one embodiment, the access device 150 is a general purpose or special purpose computing device comprising a processor, transient and persistent storage devices, input/output subsystem and bus to provide a communications path between components comprising the general purpose or special purpose computer. In one embodiment, the access device 150 includes a web-based client application, browser 152, which allows a user to access the data stored within data store 134. Examples of browser 152 include web browsers that are known in the art, such Microsoft Internet Explorer, Google Chrome, Mozilla Firefox and Apple Safari.

Although the data store 134 shown in FIG. 1 is connected to the network 132, it will be appreciated by one skilled in the art that the data store 134 and/or any of the information shown therein, can be distributed across various servers and be accessible to the server 112 over the network 132, be coupled directly to the server 112, or be configured in an area of non-volatile memory 120 of the server 112.

Further, it should be noted that the system 110 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
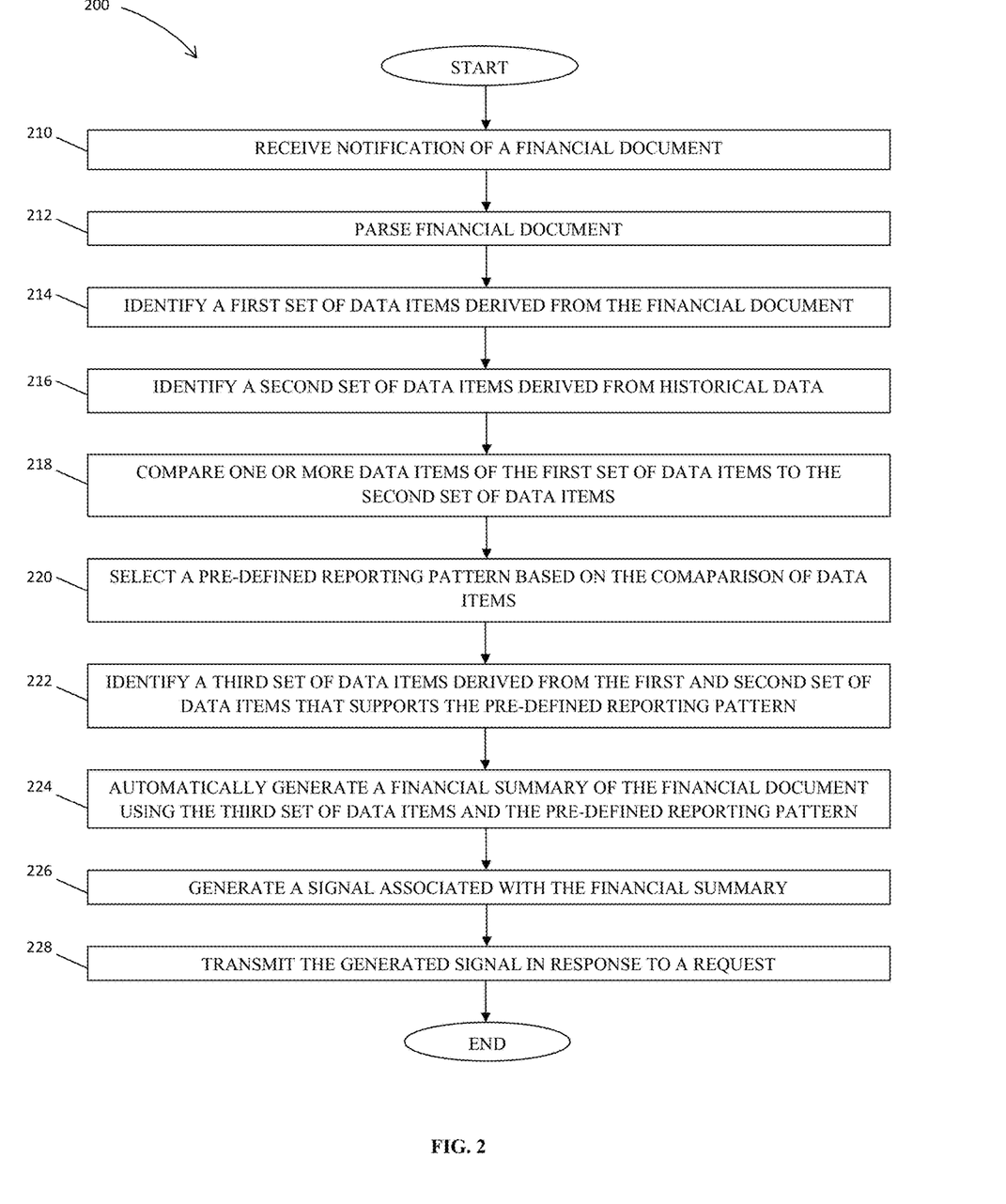
FIG. 2 is a flow diagram illustrating an exemplary computer-implemented method for interpreting and analyzing financial documents.

Turning now to FIG. 2, an exemplary method 200 for utilizing machine driven logic to interpret and analyze financial documents and generate a financial summary of an entity's financial performance is disclosed. As shown in FIG. 2 example, the identification module 124 receives notification of the availability of a financial document at step 210. In one embodiment, the financial document is stored in the fundamentals database 136 by the transmission module 130 upon receipt from an outside source. In another embodiment, the financial document is made available to the identification module 124 from secondary storage separate and apart from the system 110. As described previously, examples of a financial document include, but are not limited, a business document, public business filing, SEC filing, financial report, accounting standard, income statement, balance sheet, supplementary note, news story or article, legal document, research, historical document, policies and procedures or a combination thereof.

Upon receipt of the notification, the identification module 124 accesses the financial document and parses the textual and numerical data within the document, step 212. In one embodiment the financial document is a public business filing, such as a SEC 10-Q financial report, which provides financial information for an entity in a given time period. Next, at step 214, the identification module 124 then identifies a first set of data items derived from the parsed textual and numerical data within the financial document. In one embodiment, the first set of data items includes the entity name, the industry or industries in which the entity provides products or services, the reporting period, the reported financial data, including revenue and net income/loss statements, the reporting unit and the currency, currency exchange rate, accounting standard and consolidation basis used in reporting. For example, a SEC 10-Q financial report filed by Entity A is parsed and the identification module 124 identifies the company name as "Entity A," the industry in which Entity A provides products and services as "Commercial," the reporting period as the "twelve month period ending 30 Nov. 2013," the currency as "USD," the FX rate as "1," the accounting standard as "US GAAP," the reporting unit as "Thousands," and the consolidation basis as "Consolidated." The identified reported financial data from the exemplary SEC 10-Q report may include revenue, net income/loss statements, key performance indicators and per share analytics, for both the entire organization and apportioned according to operating segments.

Continuing the previous example, Entity A's SEC 10-Q report may provide a total revenue of $3.85 Billion, a total net income of $90.6 Million, revenue for the Construction Materials and Mining segment of $1.23 B, revenue for the Construction Services segment of $688.4 M, a net income for the Exploration and Production segment of $86.5 Million, a net income for the Natural Gas Distribution segment of $34.6 M, a Dividend per Share of $0.67 and a Basic Earnings per Share of $0.48. It is to be understood that the first set of data items is not limited to the data items described herein and that other data items that may be derived from a financial report may be identified by the identification module 124.

Upon identification of the first set of data items for an entity, the identification module 124 identifies a second set of data items from the historical data maintained in the Fundamentals database 136, step 216. In one embodiment, the second set of data items includes historical data items corresponding to the first set of reported financial data items for a previous corresponding time period. For example, the second set of data items identified includes the corresponding reported financial data reported by Entity A for the previous analogous reporting period, which in the present example is the twelve month period ending 30 Nov. 2012. According to one embodiment, the second set of data items are derived from historical data maintained in the Fundamentals database 136 as structured documents, including but not limited to eXtensible Markup Language (XML) files, as well as unstructured documents, including but not limited to public financial reports and income statements.

At step 218, the comparison module 132 compares one or more data items from the first set of data items to the second set of data items. In one embodiment, the comparison module 132 compares an entity's total revenue and the total net income/loss for the analyzed reporting periods. Continuing with our previous example, comparing Entity A's s total revenue of $3.85 Billion and total net income of $90.6 Million in the twelve month period ending 30 Nov. 2013 to a total revenue of $3.45 Billion and a total net income of $130.5 Million for the twelve month period ending 30 Nov.

2012, the comparison module 132 determines that an increase in total revenue and a decrease in a total net income has occurred.

According to one embodiment, a pre-defined reporting pattern is then selected from the set of pre-defined reporting patterns 138 by the pattern module 128 based upon the comparison of total revenue and net income for the respective time periods, step 220. According to one embodiment, a pre-defined reporting pattern outlines whether a positive or negative reason is to be provided in a financial summary to support increases or decreases in revenue and net income/losses. Continuing from the previous example, in comparing Entity A's total revenue and total net income, the pattern module 128 selects a pre-defined reporting pattern for the scenario in which revenue increased and net income decreased, which requires positive revenue reasons and negative net income reasons to be included as part of the financial summary. Table 1, presented herein, provides an exemplary list of pre-defined reporting patterns according to one embodiment.

TABLE 1

Exemplary List of Pre-Defined Reporting Patterns

| Scenario | Revenue Reason | Net Income Reason | Net Loss Reason |
|---|---|---|---|
| If revenues increase and net income increases more than | positive | positive | n/a |
| If revenues increase and net income increases equally | positive | positive | n/a |
| If revenues increase and net income increases less than | positive | negative | n/a |
| If revenues increase and net income remains flat | positive | negative | n/a |
| If revenues increase and net income decreases | positive | negative | n/a |
| If revenues increase and net loss increases | positive | n/a | negative |
| If revenues increase and net loss remains flat | positive | n/a | negative |
| If revenues increase and net loss decreases | positive | n/a | positive |
| If revenues decrease and net income increases more than | negative | positive | n/a |
| If revenues decrease and net income increases equally | negative | positive | n/a |
| If revenues decrease and net income increases less than | negative | positive | n/a |
| If revenues decrease and net income remains flat | negative | positive | n/a |
| If revenues decrease and net income decreases | negative | negative | n/a |
| If revenues decrease and net loss increases | negative | n/a | negative |
| If revenues decrease and net loss remains flat | negative | n/a | negative |
| If revenues decrease and net loss decreases | negative | n/a | positive |
| If revenues remained flat and net income increases | negative | positive | n/a |
| If revenues remained flat and net income remains flat | negative | negative | n/a |
| If revenues remained flat and net income decreases | negative | negative | n/a |
| If revenues remained flat and net loss increases | negative | n/a | negative |
| If revenues remained flat and net loss remains flat | negative | n/a | negative |
| If revenues remained flat and net loss decreases | negative | n/a | positive |

The list of pre-defined reporting patterns presented in Table 1 sets forth a variety of exemplary scenarios based on compared total revenue values and compared total net income or total net loss values for an entity, along with the corresponding reporting pattern to be utilized by the comparison module 124 in generating a financial summary. For example, if the comparison module 124 determines an increase in revenue and a decrease in net income from the current time period as compared to the previous time period, the pattern module 128 would identify a pre-defined reporting pattern that requires a positive revenue reason, i.e. a reason that would account for the increase in positive total revenue such as a positive increase in revenue for a specific business segment, and a negative net income reason, i.e. a reason that would account for the decreased net income such as a increased capital expenditures in a specific geographic segment. In another example, if it is determined that there is an decrease in total revenue and a decrease in total net loss, then the pattern module 128 would identify a pre-defined reporting pattern that requires a negative revenue reason and a positive net loss reason to be identified. Similarly, if the comparison module 124 determines an increase in total revenue and an increase in total net income that is less than the net income increase for the previous reporting period, then the pattern module 128 identifies a pre-defined reporting pattern that requires a positive revenue reason and a negative net income reason to be identified. Alternatively, the comparison module 124 may determine an increase in revenue but no net change in the total income, which translates into a pre-defined reporting pattern that requires a positive revenue reason and a negative net loss reason, i.e. a negative reason to account for no increases in net income, such as offsets created by a negative currency exchange rate for the analyzed time period.

Turning back to FIG. 2, the summary module 126 identifies a third set of data items derived from the first and second set of data items that supports the selected pre-defined reporting pattern, step 222. According to one embodiment, the third set of data items includes data items that provide positive and negative reasoning to support the increases and decreases in revenues and net income/losses. Continuing from the previous example, in which Entity A's total revenue increased and total net income decreased, the pattern module 128 selects a pre-defined reporting pattern requiring a positive revenue reason and a negative net income reason to be included in the financial summary. The summary module 126 then compares the first and second sets of data items to identify the corresponding supporting reasons by identifying increases and decreases in specific business segment performance, geographic segment performance, and operating metrics, as well as changes in supporting evidence analytics such as Dividends per Share and Earnings per Share. Continuing from the previous example, the summary module 126 may include in the third set of data items that Entity A's revenue for the Construction Materials and Mining segment increased 8% to $1.23 Billion, that the Natural Gas Distribution segment posted a net income decrease of 27% to $34.6 Million, and the Dividend per Share increased from $0.49 to $0.67 for the twelve month period ending 30 Nov. 2013 as compared to the twelve month period ending 30 Nov. 2012.

Next, at step 224, according to one embodiment, the summary module 126 automatically generates a financial summary of the financial document using the third set of data items and the pre-defined reporting pattern. In one embodiment, for example, the automatically generated financial summary includes the entity name, the increase in total revenue, the positive reasons for the increase in total revenues based on the business segment performance, the decrease in net income and the negative reason for the decrease based on business segment performance and operating metrics, as well as supporting evidence analytics in the form of per share analytics.

Figure 6:
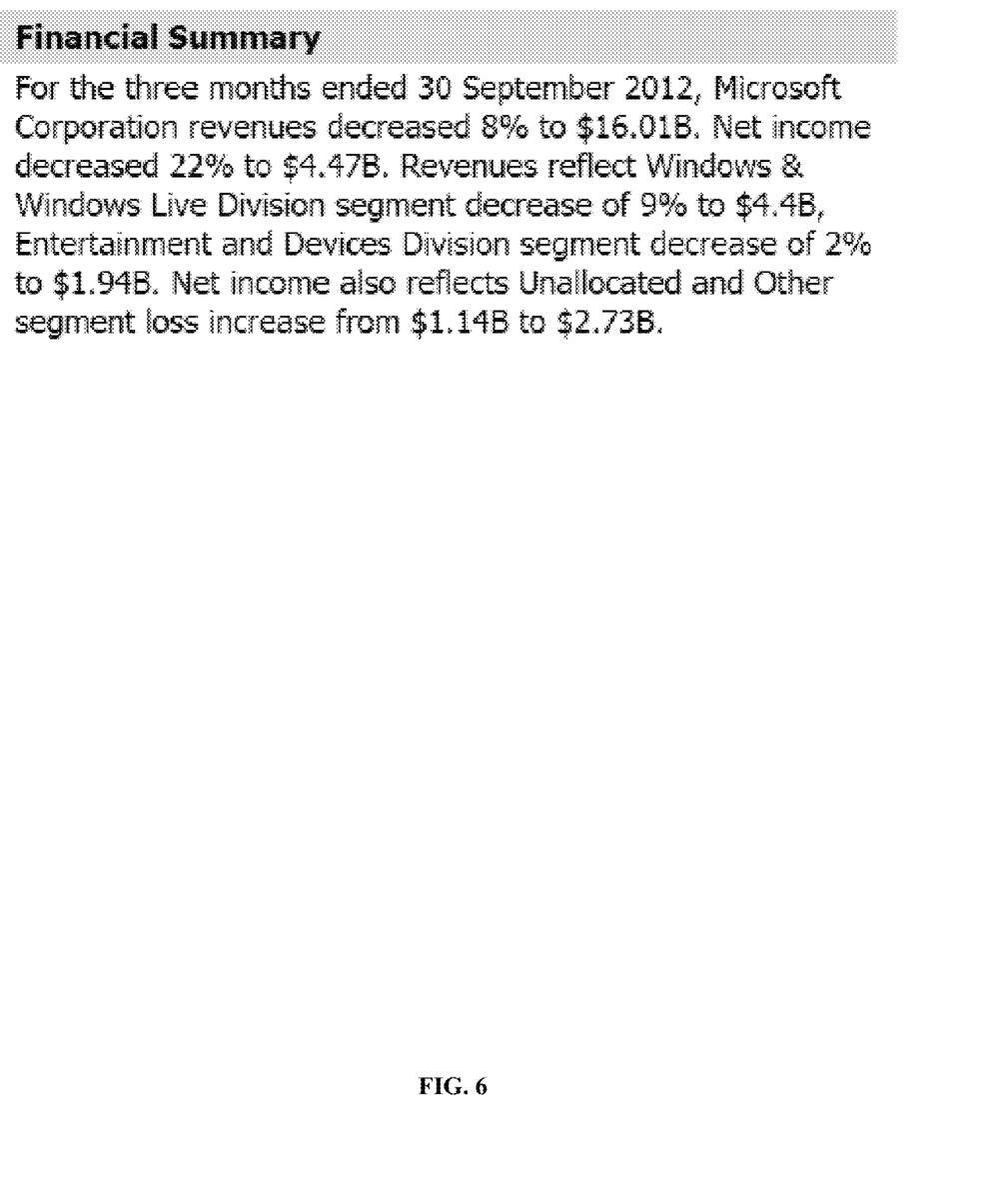
FIG. 6 is a screen diagram of an exemplary generated financial summary.

The following text serves as an exemplary financial summary, which once computed, is stored with the set of generated summaries 140: "For the twelve months ended 30 Nov. 30, 2013, Entity A revenues increased 29% to $3.85 B. Net income applicable to common stockholders excluding extraordinary items decreased 40% to $90.6 M. Revenues reflect Construction Materials and Mining segment increase of 8% to $1.23 B, Construction Services segment increase of 11% to $688.4 M. Net income was offset by Natural Gas Distribution segment income decrease of 27% to $34.6 M, Avg. Production Costs–Total increase of 8% to $13.48 per barrel. Dividend per share increased from $0.49 to $0.67. Basic Earnings per Share excluding Extraordinary Items decreased from $0.80 to $0.48." FIG. 6 also provides an exemplary financial summary automatically generated using techniques of the present disclosure, which illustrates the determined revenue and net income decreases, along with the supporting business segment revenue and net income decreases.

According to one embodiment, once the financial summary is computed, the transmission module 130 generates a signal including a link to the financial summary stored in the database maintaining the generated summaries 140, step 226. Lastly, at step 228, the transmission module 140 transmits the generated signal. In one embodiment, the transmission module 130 transmits the generated signal in response to a request received through browser 152 at access device 150.

Figure 3:
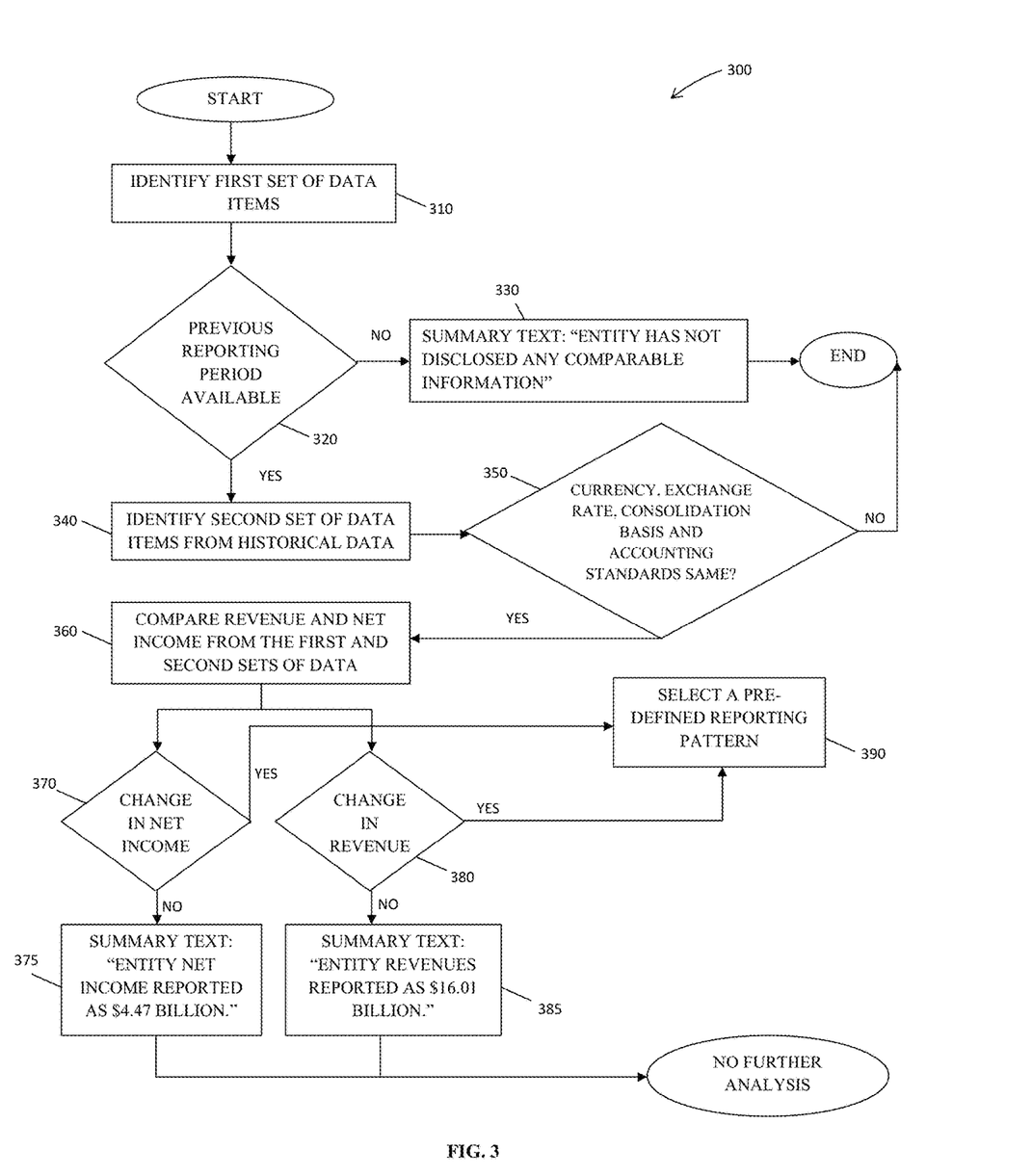
FIG. 3 is a flow diagram illustrating an exemplary computer-implemented method for comparing data from financial documents to historical data.

Turning now to FIG. 3, an exemplary computer-implemented method 300 for comparing data financial documents to historical data is disclosed. In the exemplary method shown in FIG. 3, a first set of data items is identified by the identification module 124 from one or more financial documents, step 310. According to one embodiment, the first set of data items includes an entity's total revenue, total net income and the entity's business segment revenues and net incomes for a reporting period. At step 320, a determination is made by the identification module 124 as to whether the same data items are available from the previous reporting period. If not, the summary module 126, described previously in FIG. 2 generates an automatic summary containing the text "Entity has not disclosed any comparable information," step 330 and the process then ends. It is to be understood that the term "Entity" contained in the text is used as a generic descriptor and in practice, an entity's actual name may be disclosed.

Alternatively, if the identification module 124 determines that the same data items are available from the previous reporting period, a second set of data items is identified from historical data, step 340. According to one embodiment, the second set of data items includes an entity's total revenue, total net income and the entity's business segment revenues and net incomes for the previous corresponding reporting period. A determination is then made by the identification module 124 as to whether the revenue and income values are reported using the same currency type, currency exchange rate, consolidation basis and accounting standards used in the second set of data items are the same as used in the first set of data items, step 350. If not, in one embodiment, process flow ends and a financial summary is not reported. In another embodiment, process flow continues to step 330 and the financial summary includes the text illustrated at step 330.

If the identification module 124 determines, however, that the same currency type, currency exchange rate, consolidation basis and accounting standards are used in both sets of data items, process flow continues to step 360, where the revenue from the first and second sets of data are compared. Based on the comparison, a determination is made as to whether there is a change in total net income and total revenue by the comparison module 132, steps 370 and 380. Referring to the aforementioned example, the comparison module 132 compares the total revenue for the three month period ending 30 Sep. 2012 to the total revenue for the three month period ending 30 Jun. 2012 and determines whether there is a change in revenue. If there is no change in revenue, the summary module 126 generates a financial summary that includes the text "Entity revenue reported as $16.01 Billion," step 385, and no further analysis is undertaken as to the entity's revenue. Similarly, for example, the total net income for the three month period ending 30 Sep. 2012 is compared by the comparison module 132 to the total net income for the three month period ending 30 Jun. 2012 and the comparison module determines whether there is a change in net income. If there is no change in the net income, the summary module 126 generates a financial summary that includes the text "Entity net income reported as $4.47 Billion," step 375, and no further analysis is undertaken as to the entity's net income. Again, it is to be understood that the text language is exemplary and in practice, an entity's actual name and revenue and income values may be disclosed. In another embodiment, the determination of no change in total revenue and or total net income may be treated by the present disclosure as a negative value and follow the same process flow as if the revenue or income decreased.

Figure 4:
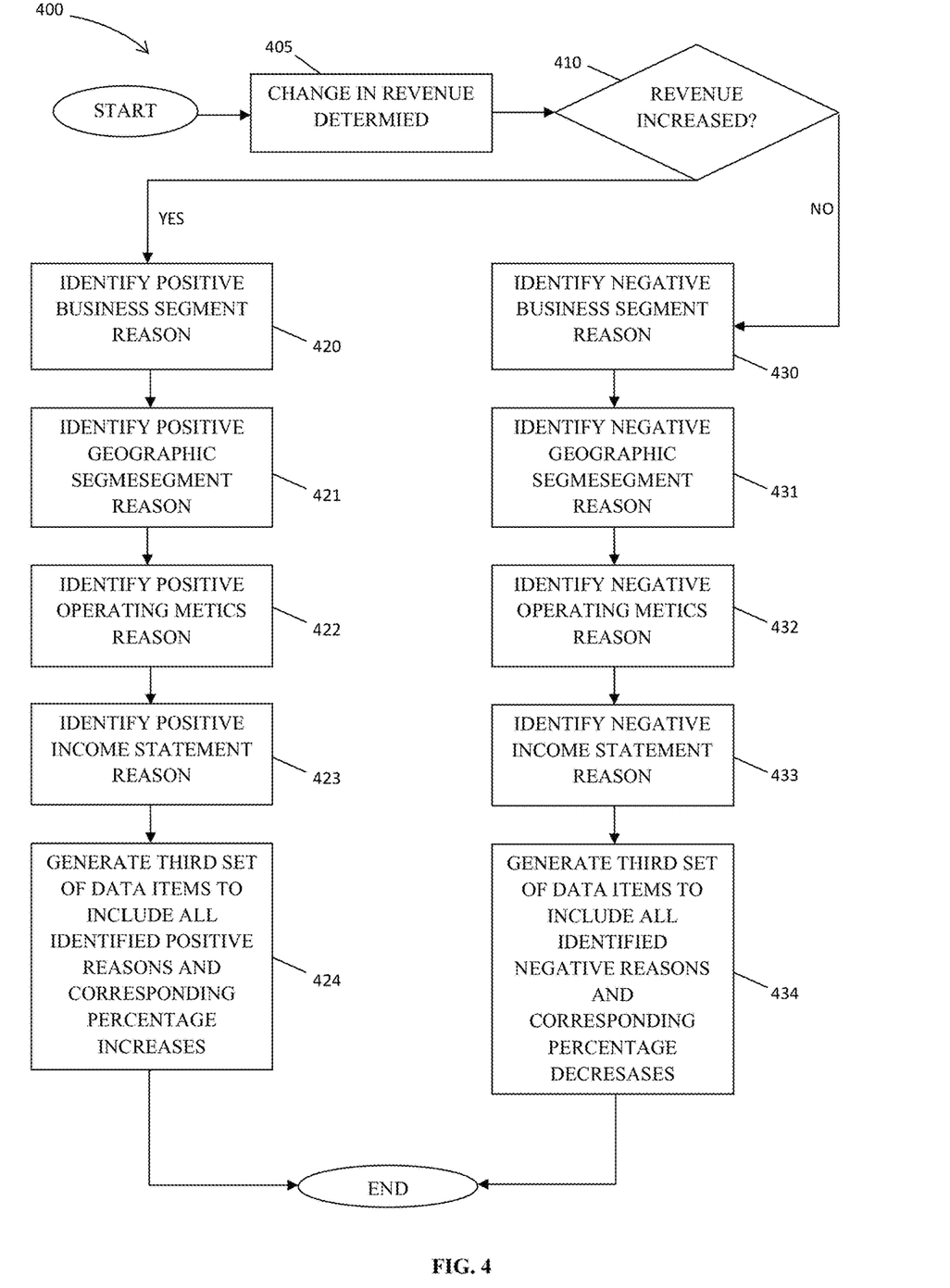
FIG. 4 is a flow diagram illustrating an exemplary computer-implemented method for analyzing revenue from financial documents and historical data according to the selected pre-defined reporting pattern.
Figure 5:
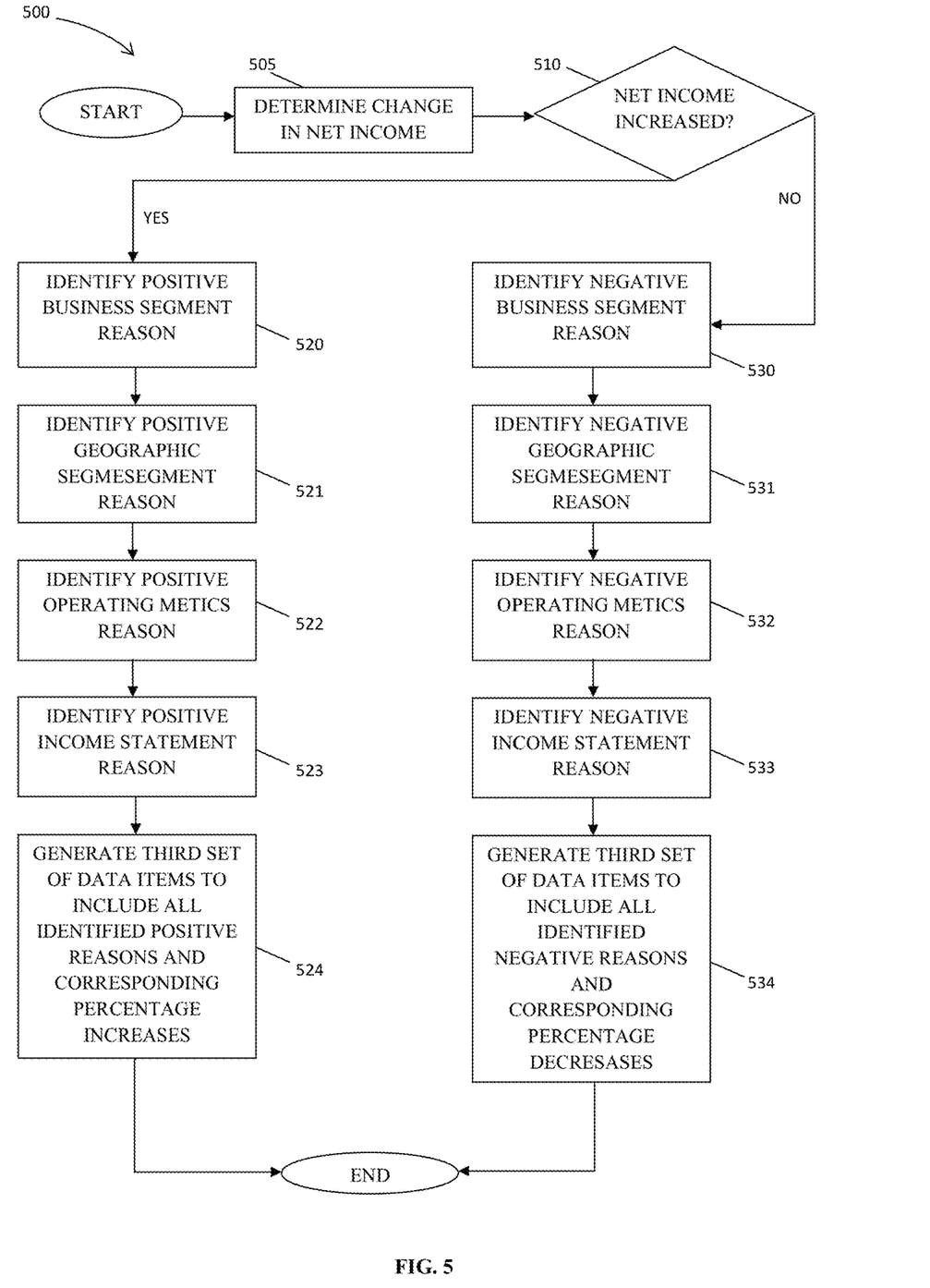
FIG. 5 is a flow diagram illustrating an exemplary computer-implemented method for analyzing net income from financial documents and historical data according to the selected pre-defined reporting pattern.

Alternatively, if the comparison module 132 determines that either the total net income or total revenue, or both, has changed between time periods analyzed, a pre-defined reporting pattern is selected by the pattern module 128, step 390, which is discussed in more detail with respect to FIGS. 4 and 5.

Turning to FIG. 4, which is flow diagram illustrating an exemplary computer-implemented method for analyzing revenue from financial documents and historical data according to the pre-defined reporting pattern, the process flow begins with the comparison module 132 of FIG. 1 having determined a change in total revenue between the first and second set of data items, step 405. The comparison module 132 next determines whether revenue has increased, step 410. If the total revenue between respective time periods has increased, the pre-defined reporting pattern defines requirements for identifying positive reasons that could be attributed to the increases in total overall revenue, including business segment reasons, geographic segment reasons, operating metrics reasons and income statement reasons, steps 420-423. According to one embodiment, the summary module 126 identifies whether there is a business segment reason attributable to the increase in total revenue, step 420. For example, the summary module 126 may analyze the comparison of all business segment revenues from the first and second sets of data items identified by the comparison module 132, in order to determine any percentage increases. If the summary module 126 identifies any increases, the business segment, its revenue and the percentage revenue increase from the previous reporting period are included in the third set of data items that may be ultimately included in the financial summary, step 424. A similar process flow is performed by summary module 126 if it is determined that the total revenue between respective time periods has decreased or is neutral, in which case the pre-defined reporting pattern defines requirements for identifying one or more negative reasons that could be attributed to the stagnation or decrease in total overall revenue, including negative business segment reasons, geographic segment reasons, operating metrics reasons and income statement reasons, steps 430-433. Again, summary module 126, upon identifying negative business segment reasons, geographic segment reasons, operating metrics reasons or income statement reasons, includes identified negative business reasons in the third set of data items, which may be ultimately included in the financial summary, step 434.

FIG. 5 is a flow diagram illustrating a computer-implemented method for analyzing net income from financial documents and historical data using the pre-defined reporting pattern. Similar to the method described with respect to FIG. 4, the comparison module 132, having determined a change in total net income between the first and second set of data items, step 505, then determines whether net income has increased, step 510. If the total net income between respective time periods has increased, the pre-defined reporting pattern requires the summary module 126 to identify positive reasons that may be attributed to the increases in total overall net income, including business segment reasons, geographic segment reasons, operating metrics reasons and income statement reasons, which are the included include in the third set of data items, steps 520-524. A similar process flow is performed by the summary module 126 if the comparison module 132 determines that the total net income between respective time periods has decreased or is neutral, in which case the pre-defined reporting pattern requires an identification of one or more negative reasons that may be attributed to the stagnation or decreases in total overall revenue, in which case he summary module 126 includes the same in the third set of data items, steps 530-534.

FIGS. 1 through 6 are conceptual illustrations allowing for an explanation of the present disclosure. It should be understood that various aspects of the embodiments of the present disclosure may be implemented in hardware, firmware, software, or combinations thereof. In such embodiments, the various components and/or steps may be implemented in hardware, firmware, and/or software to perform the functions of the present disclosure. That is, the same piece of hardware, firmware, or module of software may perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer-implemented method of automatically summarizing one or more financial documents to provide automated analysis of an entity, the method comprising:

obtaining, by a processor, a set of rules that define string outputs as a function of variables tagged from the one or more financial documents and requirements to analyze the variables;

parsing, by the processor, a first set of data items derived from the one or more financial documents and comprising values for one or more of the variables;

determining, by the processor, a second set of data items derived from historical data associated with the entity, said determining further comprises accessing historical financial information maintained in a fundamentals database, the fundamentals database further comprising structured and unstructured documents;

comparing, by the processor, one or more data items of the first set of data items to one or more data items of the second set of data items to determine whether there is a change detected in net income or revenue for the entity;

selecting, by the processor, a pre-defined reporting pattern from a set of pre-defined reporting patterns based on the change detected by the comparison, the set of pre-defined reporting patterns maintained in a structured data store comprising at least a set of pre-defined business case scenarios, the selected pre-defined reporting pattern indicative of a possible financial result of the entity, the pre-defined reporting pattern further defines requirements to identify reasons attributed to the change detected;

generating, by the processor, using the set of rules, a set of strings comprising a third set of data items supporting the selection of the pre-defined reporting pattern, wherein the supporting provides for reasoning based on analytics relating to the selection, wherein the third set of data items comprises one or more reasons attributed to the change detected, one or more data items of the first set of data items and the second set of data items, and one or more delta values between data items of the first set of data items and the second set of data items, each string in the set of string representing different aspects of the financial summary to be generated;

assembling, by the processor, the set of strings to generate a final string;

automatically generating, by the processor, the financial summary of the one or more financial documents based on the final string;

generating, by the processor, a signal associated with the financial summary; and transmitting, by the processor, the signal to an access device in response to a request for the financial summary.

2. The computer-implemented method of claim 1, wherein the first, second and third set of data items comprise numeric data items and textual data items.

3. The computer-implemented method of claim 1, wherein the first set of data items comprises one or more data items for a given reporting time period.

4. The computer-implemented method of claim 3, wherein the second set of data items comprises one or more data items for one or more comparable prior time periods to the given reporting time period.

5. The computer-implemented method of claim 1, wherein the first set of data items comprise a total revenue value and either a total net income value or a total net loss value and the second set of data items comprise a total revenue value and either a total net income value or a total net loss value.

6. The computer implemented method of claim 5, wherein the first and second sets of data items further comprise at least one of the following: business segment revenue values, business segment net income values, geographic segment revenue values, geographic segment net income value, operating metrics, dividends per share and earnings per share.

7. The computer-implemented method of claim 5, wherein the pre-defined reporting pattern comprises one or more instructions to identify a negative reason to support an observed decrease in the comparison of the total revenue value of the first set of data items and the total revenue value of the second set of data items.

8. The computer-implemented method of claim 5, wherein the pre-defined reporting pattern comprises one or more instructions to identify a positive reason to support an observed increase in the comparison of the total revenue value of the first set of data items and the total revenue value of the second set of data items.

9. The computer-implemented method of claim 5, wherein the pre-defined reporting pattern comprises one or more instructions to identify a negative reason to support an observed decrease in the comparison of the total net income value of the first set of data items and the total net income value of the second set of data items.

10. The computer-implemented method of claim 5, wherein the pre-defined reporting pattern comprises one or more instructions to identify a positive reason to support an observed increase in the comparison of the total net income value of the first set of data items and the total net income value of the second set of data items.

11. The computer-implemented method of claim 5, wherein the pre-defined reporting pattern comprises one or more instructions to identify a negative reason to support an observed increase in the comparison of the total net loss value of the first set of data items and the total net loss value of the second set of data items.

12. The computer-implemented method of claim 5, wherein the pre-defined reporting pattern comprises one or more instructions to identify a positive reason to support an observed decrease in the comparison of the total net loss value of the first set of data items and the total net loss value of the second set of data items.

13. The computer-implemented method of claim 1, wherein the financial summary further comprises an entity name and at least one of an industry value, a reporting period value, a reporting unit value, a currency type value, a currency exchange rate value, an accounting standard value and a consolidation basis value.

14. The method of claim 1, wherein the set of rules comprises a first rule to generate a first string portion relating to the reasons attributed to the change detected, the method further comprising:

accessing at least a first variable from among the variables tagged from the one or more financial documents;

outputting the first string portion based on the first variable and the first rule.

15. The method of claim 14, wherein outputting the first string portion comprises processing the first variable against a first rule comprising a condition used to identify plain language text to include in the first string portion.

16. The method of claim 15, further wherein outputting the first string portion comprises:

selecting a template from among a plurality of templates based on the condition, wherein the template includes at least some of the plain language text.

17. A system for generating a financial summary, the system comprising:

a data repository comprising one or more financial documents, one or more items of historical data and one or more pre-defined reporting patterns; and a server including a processor and memory storing instructions that, in response to receiving a request for access to a service, cause the processor to:

obtain a set of rules that define string outputs as a function of variables tagged from the one or more financial documents and requirements to analyze the variables;

identify a first set of data items parsed from the one or more financial documents associated with an entity;

identify a second set of data items derived from historical data associated with the entity, said identify further comprises accessing historical financial information maintained in a fundamentals database, the fundamentals database further comprising structured and unstructured documents;

compare one or more data items of the first set of data items to one or more data items of the second set of data items to determine whether there is a change detected in net income or revenue for the entity;

select a pre-defined reporting pattern from a set of pre-defined reporting patterns based on the change detected by the comparison, the set of pre-defined reporting patterns maintained in a structured data store comprising at least a set of pre-defined business case scenarios, the selected pre-defined reporting pattern indicative of a possible financial result of the entity, the pre-defined reporting pattern further defines requirements to identify reasons attributed to the change detected;

generate, using the set of rules, a set of strings comprising a third set of data items supporting the selection of the pre-defined reporting pattern, wherein the supporting provides for reasoning based on analytics relating to the selection, wherein the third set of data items comprises one or more reasons attributed to the change detected, one or more data items of the first set of data items and the second set of data items, and one or more delta values between data items of the first set of data items and the second set of data items, each string in the set of string representing different aspects of the financial summary to be generated;

assemble the set of strings to generate a final string;

automatically generate the financial summary of the one or more financial documents based on the final string;

generate a signal associated with the financial summary; and transmit the signal to an access device in response to a request for the financial summary.

18. The system of claim 17, wherein the first, second and third set of data items comprise numeric data items and textual data items.

19. The system of claim 17, wherein the first set of data items comprises one or more data items for a given reporting time period.

20. The system of claim 19, wherein the second set of data items comprises one or more data items for one or more comparable prior time periods to the given reporting time period.

21. The system of claim 17, wherein the first set of data items comprise a total revenue value and either a total net income value or a total net loss value and the second set of data items comprise a total revenue value and either a total net income value or a total net loss value.

22. The system of claim 21, wherein the first and second sets of data items further comprise at least one of the following: business segment revenue values, business segment net income values, geographic segment revenue values, geographic segment net income value, operating metrics, dividends per share and earnings per share.

23. The system of claim 21, wherein the pre-defined reporting pattern comprises one or more instructions to identify a negative reason to support an observed decrease in the comparison of the total revenue value of the first set of data items and the total revenue value of the second set of data items.

24. The system of claim 21, wherein the pre-defined reporting pattern comprises one or more instructions to identify a positive reason to support an observed increase in the comparison of the total revenue value of the first set of data items and the total revenue value of the second set of data items.

25. The system of claim 21, wherein the pre-defined reporting pattern comprises one or more instructions to identify a negative reason to support an observed decrease in the comparison of the total net income value of the first set of data items and the total net income value of the second set of data items.

26. The system of claim 21, wherein the pre-defined reporting pattern comprises one or more instructions to identify a positive reason to support an observed increase in the comparison of the total net income value of the first set of data items and the total net income value of the second set of data items.

27. The system of claim 21, wherein the pre-defined reporting pattern comprises one or more instructions to identify a negative reason to support an observed increase in the comparison of the total net loss value of the first set of data items and the total net loss value of the second set of data items.

28. The system of claim 21, wherein the pre-defined reporting pattern comprises one or more instructions to identify a positive reason to support an observed decrease in the comparison of the total net loss value of the first set of data items and the total net loss value of the second set of data items.

29. The system of claim 17, wherein the financial summary further comprises an entity name and at least one of an industry value, a reporting period value, a reporting unit value, a currency type value, a currency exchange rate value, an accounting standard value and a consolidation basis value.

30. Non-transitory computer readable media comprising program code stored thereon for execution by a programmable processor to perform a method for generating a financial summary, the program code causing the programmable processor to:

obtain a set of rules that define string outputs as a function of variables tagged from a financial document and requirements to analyze the variables;

identify a first set of data items derived from one or more financial documents associated with an entity and comprising values for one or more of the variables;

identify a second set of data items derived from historical data associated with the entity, said identifying further comprises accessing historical financial information maintained in a fundamentals database, the fundamentals database further comprising structured and unstructured documents;

compare one or more data items of the first set of data items to one or more data items of the second set of data items to determine whether there is a change detected in net income or revenue for the entity;

select a pre-defined reporting pattern from a set of pre-defined reporting patterns based on the change detected by the comparison, the set of pre-defined reporting patterns maintained in a structured data store comprising at least a set of pre-defined business case scenarios, the selected pre-defined reporting pattern indicative of a possible financial result of the entity, the pre-defined reporting pattern further defines requirements to identify reasons attributed to the change detected;

generate, using the set of rules, a set of strings based on a third set of data items supporting the selection of the pre-defined reporting pattern, wherein the supporting provides for reasoning based on analytics relating to the selection, wherein the third set of data items comprises one or more reasons attributed to the change detected, one or more data items of the first set of data items and the second set of data items, and one or more delta values between data items of the first set of data items and the second set of data items, each string in the set of string representing different aspects of the financial summary to be generated;

assemble the set of strings to generate a final string;

automatically generate the financial summary based on the final string;

generate a signal associated with the financial summary; and transmit the signal to an access in response to a request for the financial summary.

31. The computer readable media of claim 30, wherein the first, second, and third set of data items comprise numeric data items and textual data items.

32. The computer readable media of claim 30, wherein the first set of data items comprises one or more data items for a given reporting time period.

33. The computer readable media of claim 32, wherein the second set of data items comprises one or more data items for one or more comparable prior time periods to the given reporting time period.

34. The computer readable media of claim 30, wherein the first set of data items comprise a total revenue value and either a total net income value or a total net loss value and the second set of data items comprise a total revenue value and either a total net income value or a total net loss value.

35. The computer readable media of claim 34, wherein the first and second sets of data items further comprise at least one of the following: business segment revenue values, business segment net income values, geographic segment revenue values, geographic segment net income value, operating metrics, dividends per share and earnings per share.

36. The computer readable media of claim 34, wherein the pre-defined reporting pattern comprises program code comprising one or more instructions to identify a negative reason to support an observed decrease in the comparison of the total revenue value of the first set of data items and the total revenue value of the second set of data items.

37. The computer readable media of claim 34, wherein the pre-defined reporting pattern comprises program code comprising one or more instructions to identify a positive reason to support an observed increase in the comparison of the total revenue value of the first set of data items and the total revenue value of the second set of data items.

38. The computer readable media of claim 34, wherein the pre-defined reporting pattern comprises program code comprising one or more instructions to identify a negative reason to support an observed decrease in the comparison of the total net income value of the first set of data items and the total net income value of the second set of data items.

39. The computer readable media of claim 34, wherein the pre-defined reporting pattern comprises program code comprising one or more instructions to identify a positive reason to support an observed increase in the comparison of the total net income value of the first set of data items and the total net income value of the second set of data items.

40. The computer readable media of claim 34, wherein the pre-defined reporting pattern comprises program code comprising one or more instructions to identify a negative reason to support an observed increase in the comparison of the total net loss value of the first set of data items and the total net loss value of the second set of data items.

41. The computer readable media of claim 34, wherein the pre-defined reporting pattern comprises program code comprising one or more instructions to identify a positive reason to support an observed decrease in the comparison of the total net loss value of the first set of data items and the total net loss value of the second set of data items.

42. The computer readable media of claim 30, wherein the financial summary further comprises an entity name and at least one or an industry value, a reporting period value, a reporting unit value, a currency type value, a currency exchange rate value, an accounting standard value and a consolidation basis value.

\* \* \* \* \*